United States Patent
Wilson et al.

(10) Patent No.: US 9,284,219 B2
(45) Date of Patent: Mar. 15, 2016

(54) METHOD AND SYSTEM FOR REPROCESSING HIGH CARBON COAL FLY ASH TO PRODUCE CEMENTITIOUS MATERIALS

(75) Inventors: Bary Wilson, Coconut Creek, FL (US); Brandon Ruf Wilson, Bothell, WA (US)

(73) Assignee: Enviropower Renewable, Inc., Boca Raton, FL (US)

( * ) Notice: Subject to any disclaimer, the term of this patent is extended or adjusted under 35 U.S.C. 154(b) by 465 days.

(21) Appl. No.: 13/516,636

(22) PCT Filed: Oct. 28, 2010

(86) PCT No.: PCT/US2010/054471
§ 371 (c)(1),
(2), (4) Date: Oct. 25, 2012

(87) PCT Pub. No.: WO2011/084212
PCT Pub. Date: Jul. 14, 2011

(65) Prior Publication Data
US 2013/0032061 A1    Feb. 7, 2013

Related U.S. Application Data

(60) Provisional application No. 61/343,147, filed on Apr. 24, 2010, provisional application No. 61/284,313, filed on Dec. 16, 2009.

(51) Int. Cl.
*C04B 7/26* (2006.01)
*C04B 7/28* (2006.01)
*C04B 7/36* (2006.01)
*C10J 3/46* (2006.01)

(52) U.S. Cl.
CPC . *C04B 7/26* (2013.01); *C10J 3/463* (2013.01); *C10J 2300/093* (2013.01); *C10J 2300/0956* (2013.01); *C10J 2300/0996* (2013.01); *C10J 2300/1606* (2013.01); *C10J 2300/1631* (2013.01); *C10J 2300/1675* (2013.01); *C10J 2300/1846* (2013.01); *Y02P 40/145* (2015.11)

(58) Field of Classification Search
CPC .............. C04B 7/26; C04B 7/28; C04B 7/36; C10J 3/46
USPC ............................................ 106/745; 48/210
See application file for complete search history.

(56) References Cited

U.S. PATENT DOCUMENTS

| | | | | |
|---|---|---|---|---|
| 4,600,438 A * | 7/1986 | Harris | ........................... | 106/757 |
| 5,922,090 A * | 7/1999 | Fujimura et al. | ............ | 48/197 R |
| 6,136,089 A | 10/2000 | Hurt et al. | | |
| 6,190,429 B1 * | 2/2001 | Fujimura et al. | ............ | 48/197 R |
| 6,468,345 B1 * | 10/2002 | Zhu et al. | ...................... | 106/705 |

(Continued)

*Primary Examiner* — Paul Marcantoni
(74) *Attorney, Agent, or Firm* — Ingram IP Law, P.A.

(57) ABSTRACT

A method is provided of thermally processing carbonaceous ash and ancillary carbonaceous material to produce a carbon-free inert, pozzolanic, or cementitious material and synthesis gas. The carbonaceous ash and ancillary fuels are fed into a thermal reactor along with oxides provided in the ash or in additives including limestone or glass. Carbon in the ancillary fuel and coal fly ash is converted to synthesis gas that is combusted to generate process steam and electricity. Remaining ash exits the thermal reactor chamber for processing at high temperature in a kiln gasifier to react the remaining fixed carbon and produce carbon-free partially-fused nodules or clinker that are cooled and ground to a desired fineness for cementitious or aggregate material in concrete. Carbonaceous ash, especially high carbon coal fly ash and other carbonaceous waste, are converted to energy and non-toxic, carbon-free aggregate or cementitious material used as architectural fill or in concrete mixes.

16 Claims, 6 Drawing Sheets

(56) References Cited

U.S. PATENT DOCUMENTS

| | | | |
|---|---|---|---|
| 6,676,716 B2 * | 1/2004 | Fujimura et al. | 48/197 FM |
| 8,741,054 B2 * | 6/2014 | Fried | 106/705 |
| 2006/0283355 A1 | 12/2006 | Knowles | |
| 2008/0264301 A1 | 10/2008 | Porat et al. | |

* cited by examiner

| % Replacement in Concrete Mix | Process | Compressive Stress (Mpa) | Compressive Stress (psi) | 7 days SAI | Compressive Stress (Mpa) | Compressive Stress (psi) | 35 days SAI |
|---|---|---|---|---|---|---|---|
| 20 | ATEC | 47.7 | 7338 | 106 | 63.7 | 9705 | 105 |
| 100 | Portland Cement | 43.8 | 6923 | 100 | 55.0 | 9240 | 100 |
| 20 | CFA As Received | 40.2 | 6350 | 92 | 54.2 | 7976 | 86 |
| 20 | 1000C | | 5835 | 84 | 52.6 | 7866 | 85 |
| 20 | 1000C + coal | 41.9 | 6078 | 88 | | 7632 | 83 |

Fig. 6

METHOD AND SYSTEM FOR REPROCESSING HIGH CARBON COAL FLY ASH TO PRODUCE CEMENTITIOUS MATERIALS

CROSS REFERENCE TO RELATED APPLICATIONS

This application is a §371 national phase entry of International Application No. PCT/US2010/054471, filed Oct. 28, 2010, which claims priority to U.S. Provisional Patent Applications No. 61/343,147, filed Apr. 24, 2010 and 61/284,313, filed Dec. 16, 2009, the entire contents of which are incorporated herein by reference.

FIELD OF THE INVENTION

The present invention relates to the production of supplemental cementitious materials (SCM) or hydraulically reactive cement from coal fly ash. More particularly, the present invention relates to the production of SCM from high carbon coal fly ash, wherein carbon in the fly ash and coal is thermally processed to produce synthesis or combustion gas. Still more particularly, the present invention relates to the production of SCM from high carbon coal fly ash, wherein carbon in the fly ash and coal is thermally processed to produce synthesis or combustion gas for generating steam to produce electrical power and wherein oxides are added to the thermal process to form cementitious materials having desired properties.

BACKGROUND OF THE INVENTION

Coal fly ash (CFA) is a solid particulate by-product of coal combustion that can be removed from the flue gas stream by cyclonic separation, electrostatic precipitation and bag house filtration. CFA may contain environmental toxins, such as arsenic, beryllium, boron, cadmium, chromium VI, cobalt, lead, manganese, mercury, molybdenum, selenium, strontium, thallium, vanadium, among other environmental toxins. In the past, coal fly ash was released into the atmosphere as a result of inadequate particulate removal from coal combustion flue gasses.

Coal-fired power plants now employ methods for capturing the CFA from the flue gas stream using various techniques, including cyclonic separation, flue gas desulferization units, electrostatic precipitation, and/or bag house filtration, among other techniques. The CFA is generally stored proximate to the coal power plants in wet or dry impoundments. Alternatively, the CFA is disposed in landfills. Under appropriate conditions, it is known to use the CFA as a supplemental cementitious material (SCM) in concrete mixes. The CFA includes pozzolanic materials, such as ceramic spheres (mainly silica and alumina). When used in concrete mixes, the pozzolanic materials can enhance the long term quality, durability, and compressive strength of the resulting concrete.

In addition to the toxic components of CFA described above, coal-fired power plants generate sulfur and nitrogen oxide (SOx and NOx) emissions. If released into the environment, these oxides form weak acids upon contact with surface waters or precipitation. Power plant operators often use activated carbon to absorb SOx and NOx, as well as other acid gasses and toxic pollutants such as mercury, thus reducing harmful emissions in the flue gas stream.

The activated carbon used to absorb these pollutants increases the overall carbon content of the solid particulate material, including CFA that is recovered from the flue gas. Federal regulations prohibit using the CFA in cement and/or concrete mixes if the carbon content exceeds approximately 6%, as determined by loss of weight upon ignition (>6% LOI).

One reason that the high carbon CFA cannot be used in concrete is that the carbon interferes with air entrainment (the intentional creation of tiny air bubbles in concrete), introduced to increase the durability of hardened concrete. Thus, the activated carbon used to clean the flue gas may render the recovered CFA unusable as supplemental cementitious material. This, in turn, can result in more CFA being stored at dry landfills or in wet slurry impoundments.

Accumulations of coal fly ash and associated bottom ash and boiler slags in landfills and wet impoundments constitute a major environmental hazard. These impoundments can fail, causing billions of dollars of damage in the process. In addition, toxic components of the CFA may leach into ground water when the CFA is stored in unlined impoundments. The ponds and impoundments where much of the CFA is stored by the operators of coal fed power plants are an increasing environmental concern. The Environmental Protection Agency has proposed rules to require that CFA not used in concrete be stored in lined landfills or other approved sites. Enforcement of the rules could greatly increase the cost of CFA disposal, thereby increasing the cost of energy generated from coal.

Gasification is a process wherein organic carbonaceous (mainly organic) materials are dissociated at high temperatures in an oxygen-starved environment to form a gas known as synthesis gas, or syngas, or producer gas. The syngas includes mainly carbon dioxide, carbon monoxide, hydrogen, methane and water vapor, as well as trace amounts of sulfur and other oxides.

If the thermal reactor is operated as a gasifier and is air fed (as opposed to oxygen fed only), the syngas stream also contains nitrogen gas. This latter form of syngas, which includes di-molecular nitrogen in relatively large quantities, is more specifically referred to as producer gas. However, according to common usage of terms, the gas phase product from the thermal reactor will be referred to as syngas throughout this application. Gasification is an efficient and relatively clean method of converting organic materials to energy, as compared to combustion or incineration.

The thermal reactor/gasifier is brought to operating conditions, including operating temperature, by combusting a suitable fuel source, such as natural gas or diesel fuel. The operating temperature is attained before the feed material is introduced into the gasifier. The air inflow rate, fuel moisture content, and fuel feed rates are tightly controlled to maintain the desired temperature and oxygen partial pressure for gasification to proceed efficiently.

In this regard, additional air may be provided to the thermal reactor, which operates as a gasifier, to increase the amount of oxidation that occurs. Additional air may be used when converting some feedstocks. In some circumstances, it may be preferable to use the injected air to combust most or all of the produced syngas before it leaves the thermal reactor. Alternatively, the syngas may be combusted in a separated oxidation chamber or steam boiler, or in a boiler to which a furnace has been affixed.

What is needed is an apparatus and method of reprocessing coal fly ash to recycle otherwise unusable high carbon CFA for use as an SCM.

SUMMARY OF THE INVENTION

The present invention advantageously provides apparatuses and methods of reprocessing coal fly ash (CFA) to produce cementitious materials having desired properties, such as pozzolanic or hydraulic reactivity, or both. According to one embodiment, the present invention uses thermal treatment to remove carbon from high carbon coal fly ash. The carbon in the fly ash can gasified to form a syngas that may be used to fire a boiler, which generates steam to drive a turbine generator to produce electricity. The high carbon fly ash waste can be gasified or combusted in a fluidized thermal reactor, depending on the characteristics of the feedstock material and the ancillary fuel used. This waste to energy process is referred to as the "ash to energy and cement" ("ATEC") process.

The present invention further provides methods and apparatus for making hydraulically active cementitious material that imparts additional compressive strength to the resulting concrete, when used as a partial substitute for portland cement in concrete mixes.

Excess carbon in the CFA may result from incomplete combustion of coal, use of activated carbon in the flue gas clean-up train, or other factors. CFA composition commonly includes oxides of calcium, silicon, aluminum, iron and magnesium, as found in hydraulic cement. However, these elemental constituents, especially calcium, are generally not found in coal fly ash, or in other coal combustion products, such as bottom ash or slag, in the relative concentrations appropriate for the production of hydraulic cement or hydraulically reactive SCM.

It will be clear to one skilled in the art that for each different type of CFA to be reprocessed, specific formulation and reprocessing methods are employed based on at least the initial CFA properties, the desired SCM type, the CFA rough classification (C or F), the fixed carbon content, the moisture content, the elemental composition, the calcium oxide content, the silicon oxide content, the alumina content, and the alkali content, among other properties.

The present invention can be used to re-process both fresh and stored CFA, whether dry or ponded (wet). The present invention provides several economic and environmental advantages for long term storage or disposal of CFA as compared to current practices, as well as to other methods of removing carbon from high carbon fly ash. As described below, the SCM produced from high carbon fly ash according to the present invention can enhance the early compressive strength of concrete and can be used as an additive in high strength concrete.

BRIEF DESCRIPTION OF THE FIGURES

A more complete understanding of the present invention, and the attendant advantages and features thereof, will be more readily understood by reference to the following description when considered in conjunction with the accompanying drawings wherein:

FIG. 6 illustrates a chart of compressive strength for Portland cement and cement formed from reprocessed fly ash mixture, based on a number of cement curing days.

DESCRIPTION OF THE INVENTION

As an initial matter, while certain embodiments are discussed in the context of well-known cement mixtures, which are hereby incorporated by reference, the invention is not limited in this regard and may be applicable to any cement mixtures. The present invention provides a method and an apparatus for reprocessing CFA, and especially high carbon CFA, using a thermal process that produces hot synthesis gas, combustion gas and flue gas.

One of ordinary skill in the art will readily appreciate that CFA compositions vary widely. Generally, Class C CFA materials have relatively higher calcium oxide content and are more likely to exhibit cementitious reactivity prior to thermal reprocessing. By contrast, Class F CFAs typically have relatively higher silicon oxide content and are more likely to yield pozzolanic SCM materials. As described below in detail, practice of the invention entails the adjustment of process conditions depending on the CFA type.

Figure 1:
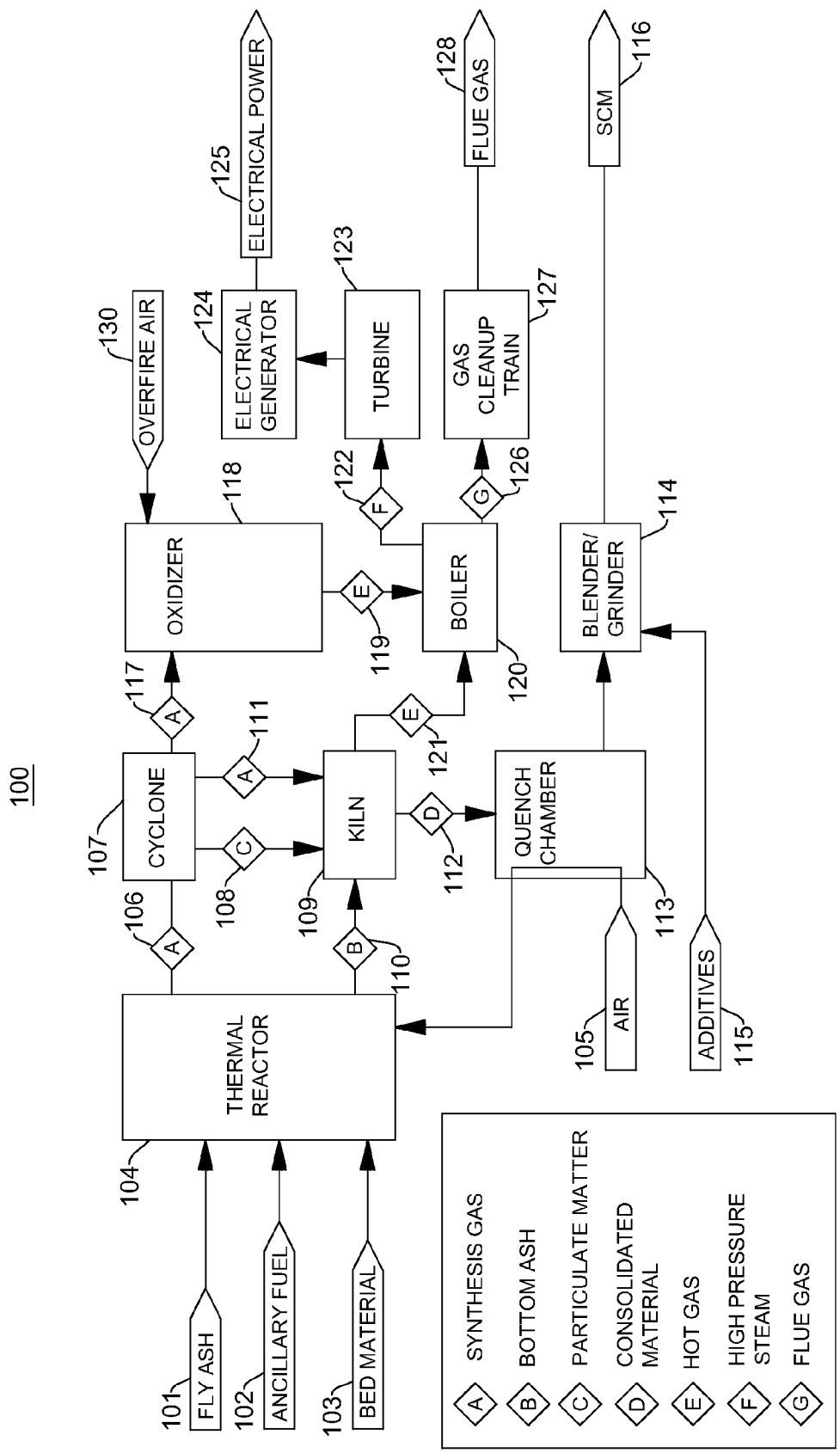
FIG. 1 illustrates a system schematic diagram illustrating the overall ash to energy and cement (ATEC) process, according to one embodiment of the present invention.

Referring now to the drawing figures, FIG. 1 illustrates an exemplary coal fly ash re-processing and beneficiation structure 100 provided in accordance with principles of the present invention. When the thermal reactor 104 is operated in a gasification mode, ancillary carbonaceous materials may be added to the thermal reactor 104 during the thermal treatment process in order to increase the quality and quantity of produced syngas 106. Water may be introduced into the feedstock in the form of moisture or supplemental steam in order to increase the hydrogen content of the syngas 106. One of ordinary skill will readily appreciate that other forms of water may be used. Increasing the hydrogen content of the syngas 106 increases the calorific value of the syngas 106.

Inorganic oxides, such as bed material 103, may be introduced into the thermal reactor 104 to achieve a desired cementitious material product. Depending on properties of the starting materials and on selected process parameters, the product material may exhibit various characteristics, including pozzolanic characteristics or hydraulic cementitious reactivity. According to one embodiment of the present invention, the resulting synthesis (syngas) gas 106 or combustion gas may be used to generate steam for powering a turbine 123 or for powering another electrical energy source 124.

A source of unprocessed or raw CFA 101 may be obtained from dry landfills or wet impoundments, among other sources. The raw CFA 101 may be stored in a silo or hopper prior to being processed. Ancillary fuel 102, which also may be stored in a silo or hopper prior to introduction into the thermal reactor 104, may include coal, shredded tires, waste oil, waste coal, or other high BTU materials.

The bed materials 103 may be used to produce hydraulically active cementitious material from CFA 101. The bed materials 103 may include limestone or other materials with sufficient calcium oxide content. For example, sand, coal combustion bottom ash and properly sized boiler slag all can be used as bed material 103, which serves the function of distributing and transferring heat in the thermal reactor 104 when the thermal reactor 104 is operated in fluidized bed mode. Crushed limestone is a preferred component of the bed material 103. As show more specifically in FIG. 2, the CFA 101, ancillary fuel 102 and bed material 103 may be stored in containers, such as hoppers or silos, in preparation for processing.

Coal fly ash 101, ancillary fuel 102, and bed materials 103 may be introduced into the thermal reactor 104 by suitable mechanical devices, such as an auger or other mechanical device. The materials entering the thermal reactor 104 are selected according to the properties of the CFA 101 and the desired characteristics of the resulting cementitious product 116.

The thermal reactor 104 produces a gas stream, including a fuel rich hot syngas or a mostly oxidized syngas 106, depending on the operating conditions of the thermal reactor 104. The syngas 106 exiting the thermal reactor 104 may include entrained solid particles that may be removed by the cyclone 107. Solid particles 108 removed from the overhead syngas 106 stream may be sent to the kiln 109 for further processing. A portion of clean syngas 111 may be routed to the kiln 109 to be used as a kiln fuel.

In embodiment where the thermal reactor 104 is configured to operate as a gasifier, a portion of the clean syngas 117 may be diverted and mixed with air 130 that is introduced into an oxidizer 118 to produce hot gases 119 for heating a steam boiler 120. Steam 122 from the boiler 120 is used to drive a gas turbine 123, which in turn drives an electrical generator 124 to produce electric power 125 for sale to the grid.

The thermal reactor 104 produces ash 110 having a desired elemental and oxide composition that is conveyed to the rotating kiln 109. The ash 110 is heated to sufficient temperature to form clinker or nodules 112. For example, the ash 110 may be heated to a range of between 1300° and 1500° C. The clinker or nodules 112 may be cooled and ground or milled to make hydraulically reactive or pozzolanic cementitious material. The hot clinker or nodules 112 leaving the kiln 109 are cooled in quench chamber 113 by a counter current air stream from an air source 105, for example. The warm air produced by the quench chamber may be used as feed air the thermal reactor 104. The feed air may be used to fluidize the bed material 103 within the thermal reactor 104. The cooled clinker material 112 may be blended in the blender/grinder 114 with additives 115 and may be ground to a desired particle size in the blender/grinder 114 to produce a hydraulically or pozzolanically reactive cementitious material 116.

The clean syngas 111 extracted from the cyclone 107 may be used to fire the rotating chamber of kiln 109. The hot gas from the rotating kiln exhaust 121 is directed to the boiler 120, where the thermal energy content is used to help generate steam 122. Flue gas 126 from the boiler 120 is sent through the gas clean up train 127 before being released through a suitable stack as flue gas 128.

Figure 2:
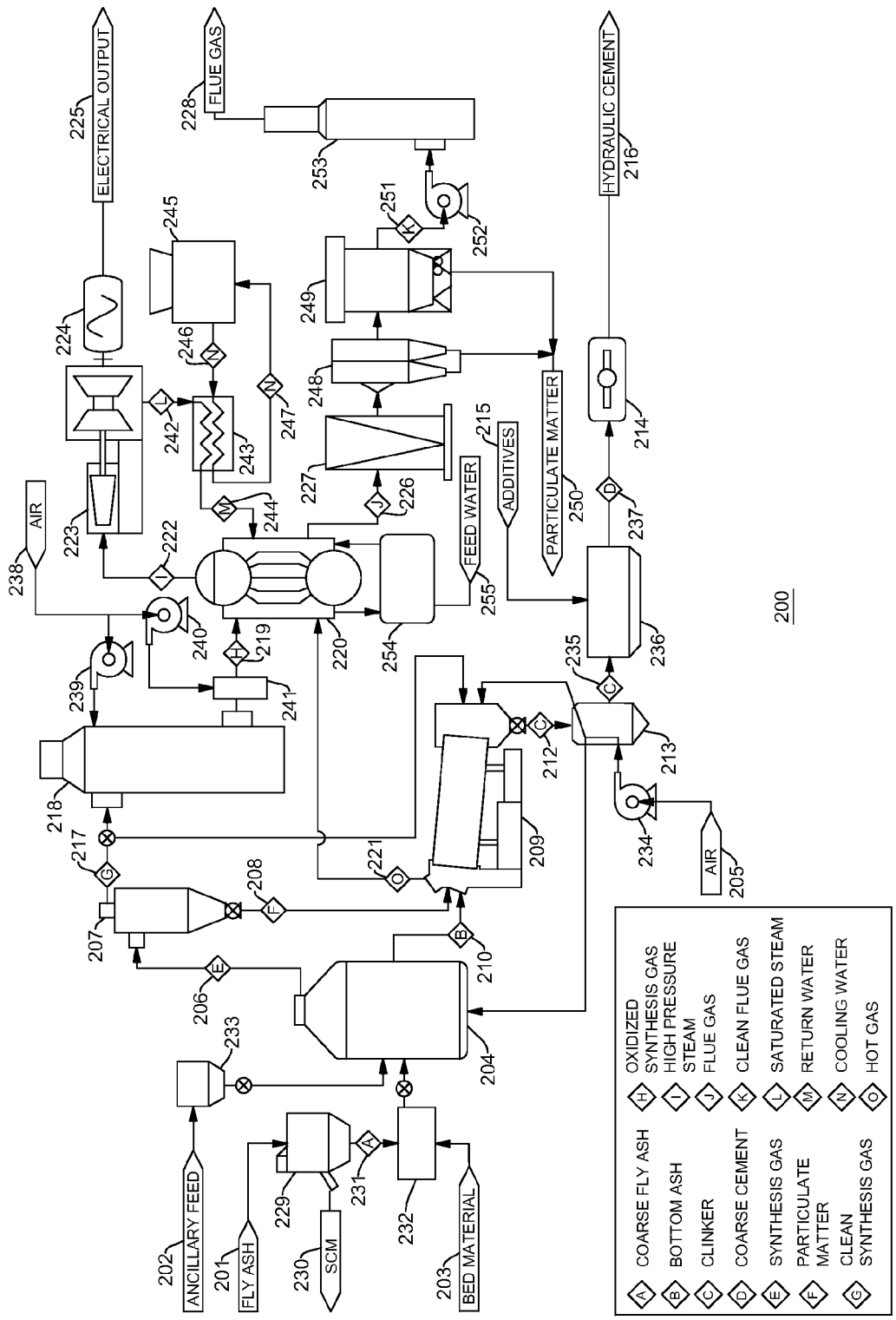
FIG. 2 illustrates a system diagram illustrating the overall ash to energy and cement (ATEC) process, according to a second embodiment of the present invention.

FIG. 2 illustrates a second exemplary coal fly ash re-processing and beneficiation structure 200 according to principles of the present invention. Ash re-processing and beneficiation structure 200 generates synthesis gas 206 that fires a boiler 220 to produce steam for driving a steam turbine 223 that generates electricity.

According to one embodiment, coal fly ash 201 is stored in a silo or hopper that provides fresh or stored CFA 201 to an air classifier 229 or other suitable device for separating high carbon fly ash fraction from a low carbon fly ash fraction. One of ordinary skill in the art will readily appreciate that CFA compositions vary widely, and that some CFA materials will be suitable for size separation to generate high carbon content and low carbon content fractions, while other CFA materials will not be suitable for such separation.

In the case where size separation is possible, fly ash source 201 may be coupled to an air classifier or particle size separation unit 229 that separates CFA particles based on particle size and density criteria, among other criteria. For example, the air classifier 229 separates high carbon fraction coal fly ash (generally smaller particles) from low carbon fraction coal fly ash (generally comprised of larger diameter particles). One of ordinary skill in the art will readily appreciate that various techniques, such as electrostatic separation or other techniques, may be employed to separate the high carbon fraction coal fly ash from the low carbon fraction coal fly ash.

An ancillary fuel hopper 233 may be provided to store fuel from an ancillary fuel source 202. The fuel may include pulverized coal, shredded tires, or mixtures of these or other high BTU materials. Alternatively, the ancillary fuel hopper 233 may store other fuel sources. The air classifier 229 and bed material source 203 may deliver the high carbon CFA fraction and ancillary fuel mixture 231 to a mixing hopper 232.

A first SCM product 230 may include cementitious materials, such as pozzolanic supplementary cementitious material, removed from the feed CFA material 201. The air classifier 229 need not be used when the carbon content of the CFA 201 is sufficiently high or the CFA 201 is not amenable to separation of high carbon and low carbon fractions by air classification. If needed, a pelletizer (not shown) may be used to consolidate the CFA 201 and/or ancillary fuel 202 prior to introduction into the thermal reactor 204.

The mixing hopper 233 may deliver a mixture of pulverized fuel source to the thermal reactor 204 in a metered manner at a rate so as to maintain the desired temperature in the thermal reactor 204 for allowing gasification and/or full combustion reactions to proceed. In the embodiment depicted in FIG. 2, the thermal reactor 204 operates as a gasifier and maintains a temperature in the range of 800 to 1200° C.

The mixing hopper 232 is provided to mix high carbon CFA fractions 231, and bed material 203, including calcium oxides, silicon oxides, iron oxides, and aluminum oxides or other materials. The mixing hopper 232 delivers the mixed materials to the thermal reactor/gasifier 204 using a suitable delivery device, such as an auger screw feed. The mixing hopper 232 may include structures that blend or mix the components therein, including the high carbon fraction CFA 101, among other components. Ancillary fuel 202 fed from hopper 233 may be pelletized, if needed. As desired, ancillary fuel 202 from the ancillary fuel hopper 233 may be delivered to the thermal reactor 204.

In the embodiment illustrated in FIG. 2, the thermal reactor 204 may be coupled directly or indirectly to a bed material source 203 that feeds inorganic oxide materials to the thermal reactor 204. The inorganic oxide materials may include limestone, coal combustor bottom ash, silica sand, silica fume, or other inorganic oxide materials. The bed material 203 helps distribute heat when a bed within the thermal reactor 204 is fluidized. The bed material 203 also may participate in the formation of calcium silicates and other cementitious components in the thermal reactor 204 or kiln 209.

The thermal reactor 204, which operates as a gasifier in this embodiment, may be coupled to an ambient air source 205 that provides pressurized ambient air during the gasification process via an air pump 234. The pressurized ambient air may be preheated in the kiln quench unit 213 and introduced to the thermal reactor 204 to maintain an oxygen partial pressure and/or to fluidize the bedding material within the thermal reactor 204.

The CFA source 201 and the bed material source 203 introduce CFA and calcium rich components, such as crushed limestone, lime, or other materials, into the thermal reactor 204, along with liquid or solid ancillary fuel materials, such as coal. According to one embodiment, the CFA and calcium rich components are heated in the thermal reactor 204 to temperatures of 1,000 degrees C. or greater, causing the formation of synthesis gas. The synthesis gas includes mainly nitrogen, carbon dioxide, carbon monoxide, hydrogen, and methane, water vapor and other volatile components. During the gasification process, the carbon and hydrogen in the coal and the CFA or other ancillary fuel is converted into synthesis gas 206.

Water may be introduced into the thermal reactor 204 in the form of moisture that is included in the ancillary feed or a separate steam injection, among other sources, to enhance the hydrogen content of the syngas 206. The hydrogen results from the water/gas shift and other known gasification reactions that proceed in a reducing atmosphere at high temperatures and in the presence of known catalysts.

A conduit is coupled to the thermal reactor 204 to extract the synthesis gas 206, which may include entrained solid particles. The synthesis gas 206 is directed to a cyclone 207 that removes particulate matter 208 from the synthesis gas 206. Clean syngas 217 exits the cyclone 207 and enters the oxidizer chamber 218, where air 238 from pump 239 is injected to promote combustion. The oxidizer chamber 218 increases the temperature of the clean syngas and air mixture before the mixture is delivered to the boiler 220. The particulate matter 208 may be directed to the kiln 209.

Combustion of the clean syngas 217 produces hot gas that enters a final re-oxidation unit or burner 241, where additional air from pump 240 is used to complete the combustion process. Hot combustion gases 219 exiting the final re-oxidation unit or burner 241 enter the boiler 220. The boiler 220 produces steam 222 that is directed to a steam turbine 223, which can be a multi-stage turbine incorporating both back pressure and condensing stages. Other turbine configurations may be used. The steam turbine 223 can drive an electrical generator 224 that produces electrical power 225, which can be conveyed to a power grid (not shown) for sale and distribution.

A condenser 243 may be coupled to the steam turbine 223 for condensing to water the low pressure steam 242 exiting the steam turbine 233. A cooling tower 245 may be provided to dissipate heat from the steam using a heat exchanger and evaporator in which a heat exchange fluid is circulated. The heat exchange fluid is typically water 246, 247. The low pressure steam cooling device 245 is provided when a condensing turbine stage is not used. A water conditioner (not shown) may be provided to condition condensate water 244 before the condensate water 244 is returned to the boiler 220. Additional feed water 255 and boiler circulating feed water may be provided to a water conditioning unit 254 as needed to maintain boiler water quality.

Flue gas 226 exiting the boiler 220 may be cleaned before being released. Flue gas clean-up components may include a flue gas desulfurization unit 227, an electrostatic precipitator 248, and a bag house 249 with carbon or lime injection, or both. Particulate materials recovered from these flue gas clean-up units 227, 248 and 249 can be recycled to the thermal reactor 204. The clean flue 251 gas is pressurized by a pump 252 and released through a stack 253. The flue gas clean-up train may include process units as needed. Commonly the flue gas clean up train includes at least a bag house 249 to remove the particulate from the flue gas stream. Bag house particulate matter 250 may be recycled to the thermal reactor or gasifier 204.

In the present embodiment, the thermal reactor 204 delivers inorganic solids, such as spent bed material 203, inorganic ash and bottom ash 210, among other solids, to the kiln 209. Alternatively, the inorganic ash and bottom ash 210 may be captured without further processing in the kiln 209. The kiln 209 is described in more detail in FIG. 3. According to one embodiment, the kiln 209 may be a rotating kiln that is fired or heated using clean synthesis gas 217, coal or other fuel.

The ash 210, which includes CFA inorganic components, calcium oxides, and other inorganic and oxide materials, is removed from the thermal reactor 204 after gasification. This heated ash 210 becomes inorganic ash or vitreous frit material depending on the temperature attained in the thermal reactor 204. The heated bottom ash 210, together with the ash 208 from the cyclone, is heated and mixed further in the kiln 209 to form partially fused material, such as nodules or clinker 212. Inorganic ash may also be entrained in the syngas leaving the reactor 104. This inorganic ash 208 is subsequently separated from the syngas by the cyclone 107. Clinker 212 is a solid material produced by the thermal reactor 204 and/or kiln 209 that is partially fused (mainly in the kiln 209) to from lumps or nodules 212. These nodules 212 exit the kiln and are cooled in the quench unit 213. The quench unit 213 produces cooled nodules or clinker particles 235 that are stored in a hopper 236.

The rotary kiln 209 may also receive particulate material 208 from the cyclone 207 and hot bottom ash 210 from the thermal reactor 204 as feeds. The clean syngas 217 can be used as fuel for various devices. Coal or other suitable fuel also may be used to fire the rotary kiln 209. Hot exhaust gas 221 exiting the kiln 209 may be routed to the boiler 220 to produce steam 224.

Any inorganic material introduced by the bed material source 203, or that remains from the gasification of the coal or ancillary fuel, may produce oxides that are removed from the thermal reactor 204 to the kiln 209 through incorporation of the oxides in the nodule or clinker 212 produced in a kiln 209. The low carbon inorganic bottom ash 210 product resulting from the gasification of the inorganic material includes calcium, silicon, aluminum, and iron oxides, among other products present in approximately the same ratios as in ordinary portland cement (see Table 1 below). After carbon burn-out and partial formation of calcium silicates, the low carbon inorganic bottom ash 210 product may be recovered as a low carbon cementitious material product or processed further in the rotating kiln 209.

The nodules or clinker 235 may be processed to yield a reactive SCM with hydraulic or pozzolanic cementitious characteristics. The partially fused material and clinker 237 exiting the hopper 236 can be subsequently ground to a suitable particle size in grinder 214 for use as a cementitious material or hydraulic cement 216.

Further processing may include addition and mixing of additive materials 215 such as gypsum, powdered limestone, or other materials. In the present embodiment, the product is hydraulic cement 216. In this and other embodiments, the reactive cementitious material product may be further ground and mixed with clean pozzolanic materials, such low carbon coal fly ash, to form the final cementitious material 216.

Figure 3:
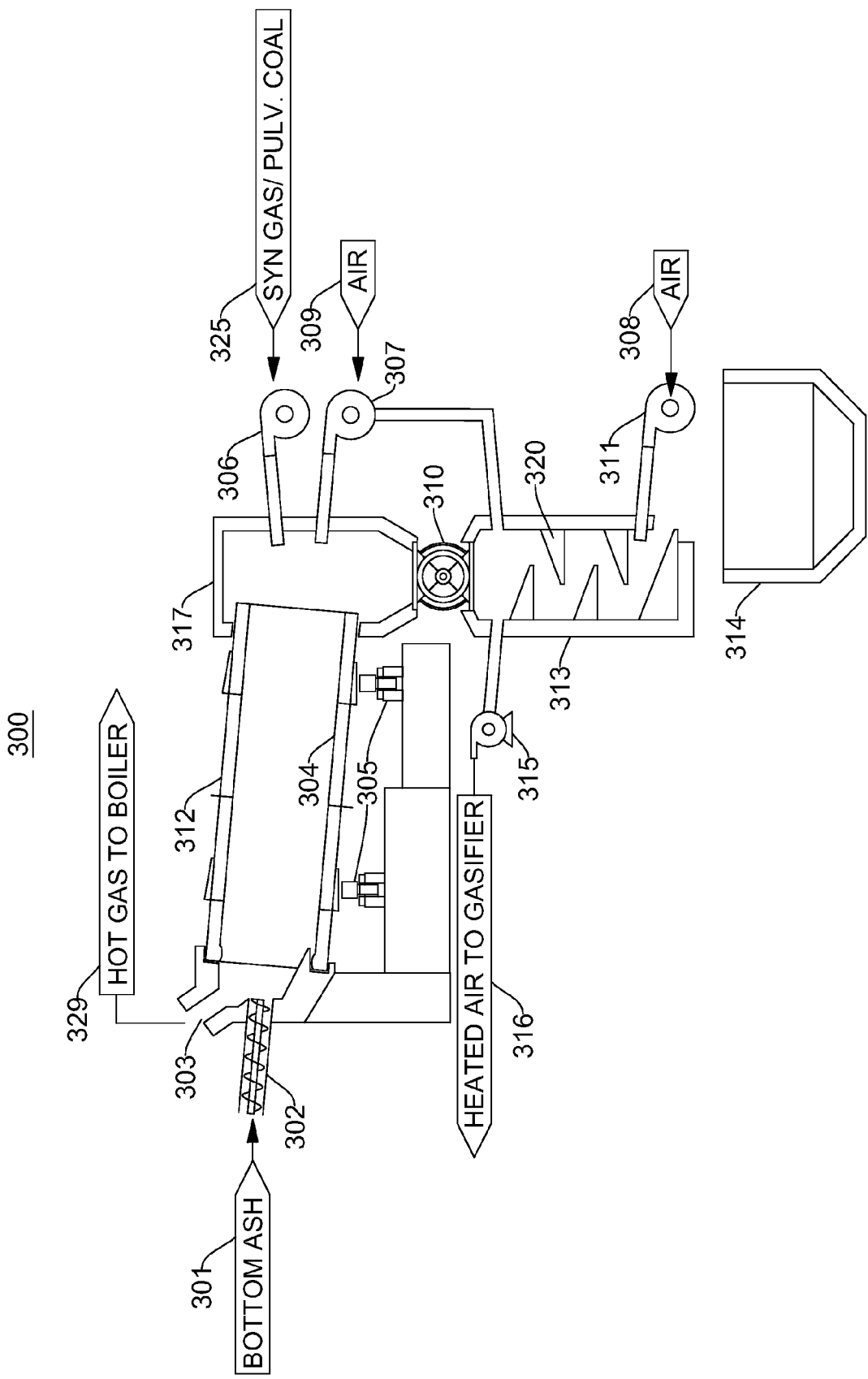
FIG. 3 illustrates a rotating kiln, kiln feed, and SCM nodule quench elements of the present invention.

FIG. 3 illustrates an exemplary kiln unit structure 300 of a coal fly ash re-processing and beneficiation structure according to principles of the present invention. The kiln unit 300 includes a rotating refractory-lined kiln drum or chamber 312, a drive mechanism 305 and quench chamber 313. The kiln rotating chamber 312 receives the hot bottom ash material 301 from the thermal reactor (not shown) using an auger 302 or other suitable device that limits the backflow of hot gas 329 from the kiln unit 300 into the thermal reactor 204. The kiln refractory lined drum or chamber 312 is heated by a burner 306 that uses syngas, pulverized coal or other fuel 325. Hot combustion gases 329 exit the rotating kiln 312 through exhaust port 303 and can be directed to a cyclone (not shown) or directly to a boiler (not shown) for generation of steam.

Ambient air 308 and/or pre-heated air 309 are admitted to the kiln chamber 312 under slight pressure to allow partial combustion of the fuel 235. The temperature gradient in the refractory 304 lined rotating kiln chamber 312 is such that the bottom ash 301 material entering the kiln 312 is increased to approximately 1450 degrees C. before exiting the rotating portion of the kiln 312 into the receiver portion 317 of the kiln.

A lock mechanism 310 allows the hot clinker to enter the quench chamber 313 by force of gravity. The quench chamber 313 is isolated from the receiver portion 317 by the lock mechanism 310. The quench chamber 313 includes a set of baffles 320 that direct a countercurrent of air 308 produced by air pump 311 over the nodules as they descend to the grate hopper 314. A portion of the pre-heated air 316 may be pumped to the thermal reactor/gasifier (not shown) via air pump 315. A portion of the pre-heated air 316 may be routed to the kiln 312 via air pump 307. A grate hopper 314 may be coupled to the kiln quench chamber 313 to receive and further cool the clinker or nodules. The quench chamber 313 may deliver the clinker or nodules to the hopper 314 for further cooling and storage prior to further processing.

Formulations and Products of the Present Invention

It will be clear to one ordinarily skilled in the art that the variety in the types and composition of CFA, and the desire for specific characteristics of SCM and cementitious materials, results in the adjustment of the method and apparatus of the present invention to account for these various conditions, compositions and end product requirements. As an illustration of the variety of CFA and other coal combustion products that can be used as feed stocks and bed materials in the process of the present invention, Table 1 below lists oxide compositions for Portland cement, as well as typical Class C and Class F fly ash materials and bottom ash from the combustion of a bituminous coal.

characteristics may include fixed carbon content, carbon content, moisture content, elemental composition, calcium oxide content, silicon oxide content, alumina content, and alkali content, among other fly ash characteristics.

For example, the CFA classification and content are used to select additive materials for both the thermal treatment process and kiln firing and grinding. According to one embodiment, the invention may produce resulting cementitious materials having early stage hydraulic reactivity characteristics or pozzolanic activity characteristics only. The invention may produce other types of resulting cementitious materials having enhanced commercial value as compared to raw, unprocessed material.

According to one embodiment and referring to FIG. 2, the kiln 209 may be programmed to maintain a temperature above approximately 1,450° C. in order to form a phase of the calcium silicates that produces hydraulically reactive product cementitious materials. The reactions that proceed in the rotating kiln can also form oxides with calcium to silicon ratios for both tricalciumsilicate and dicalciumsilicate.

According to one embodiment, the invention may be used to remediate Class F CFA taken from wet CFA storage impoundments. Prior to remediating the wet Class F coal fly ash by producing reactive SCM, the bulk elemental composition of the dried feed (moisture content less than 30%) may be adjusted to contain approximately 22% $SiO_2$, 5% $Fe_2O_3$, 5% $Al_2O_3$, 2% MgO and 66% CaO by weight. For example, the required elemental composition (or oxide composition) ratio may be achieved by adding $CaCO_3$ and $Fe_2O_3$ to the Class F fly ash and mixing the resulting feed mixture in the feedstock blender 232 or in the bed material source 203.

Figure 4:
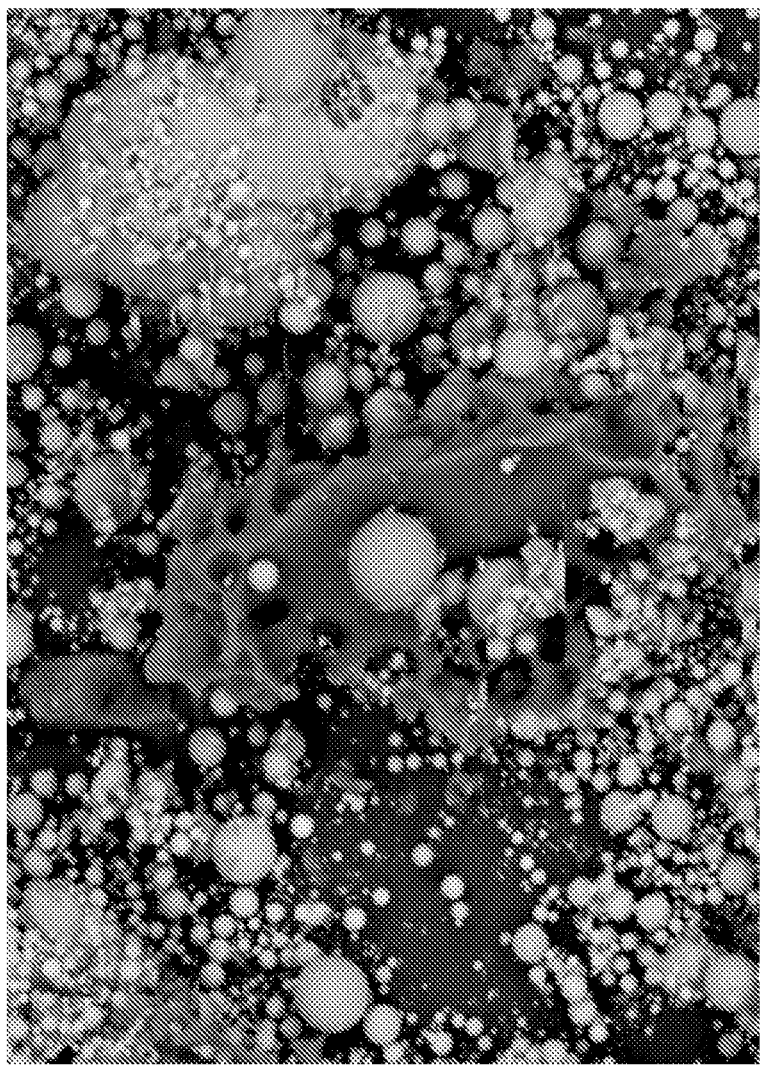
FIG. 4 illustrates an electron micrograph image of high carbon fly ash, showing the readily distinguishable carbon particles and ceramic spheres (cenospheres)

FIG. 4 is an electron micrograph of a high carbon Class C fly ash that, in this raw form, is unsuitable for use as an SCM in concrete mixtures. This micrograph is provided as a comparison with micrographs of the re-processed CFA according to the (ATEC) process of the present invention shown in FIG. 5. The FIG. 4 micrograph shows the presence of carbon depicted as a large dark amorphous object in the center of the field. Also visible in the FIG. 4 micrograph are the fly ash cenospheres depicted as hollow spherical ceramic objects of various sizes. Comparison with the micrographs and elemen-

TABLE 1

Typical oxide compositions for bottom ash and Class F and Class C coal fly ash.

| | | | Portland Cement | Class C | Class F | Coal Combustion Products (Typical) Bituminous Bottom | |
|---|---|---|---|---|---|---|---|
| Oxide | Shorthand | Common Name | Weight Percent | Fly Ash Wt % | Fly Ash Wt % | Ash Wt % | Oxide |
| CaO | C | lime | 64.7% | 22.3% | 1.5% | 1.2% | CaO |
| $SiO_2$ | S | silica | 21.% | 36.3% | 56.8% | 51.0% | $SiO_2$ |
| $Al_2O_3$ | A | alumina | 6.2% | 18.4% | 26% | 22.2% | $Al_2O_3$ |
| $Fe_2O_3$ | F | ferric oxide | 2.7% | 7.7% | 8.5% | 20.3% | $Fe_2O_3$ |
| MgO | M | magnesia | 2.6% | 4.6% | 0.96% | 0.8% | MgO |
| $K_2O$ | K | alkalis | 0.61% | 0.8% | 2.8% | 2.26% | $K_2O$ |
| $Na_2O$ | N | alkalis | 0.34% | 3.7% | 0.28% | 0.25% | $Na_2O$ |
| $SO_3$ | S | sulfur dioxide | 2.0% | 2.7% | 0.27% | 0.23% | $SO_3$ |
| $CO_2$ | C | carbon dioxide | na | 1.4% | 1.2% | 1.0% | $TiO_2$ |
| $H_2O$ | H | water | na | 1.2% | 0.4% | 0.35% | $P_2O_4$ |
| | | | | 33% | 8% | 11.5% | Carbon* |

Figure 5:
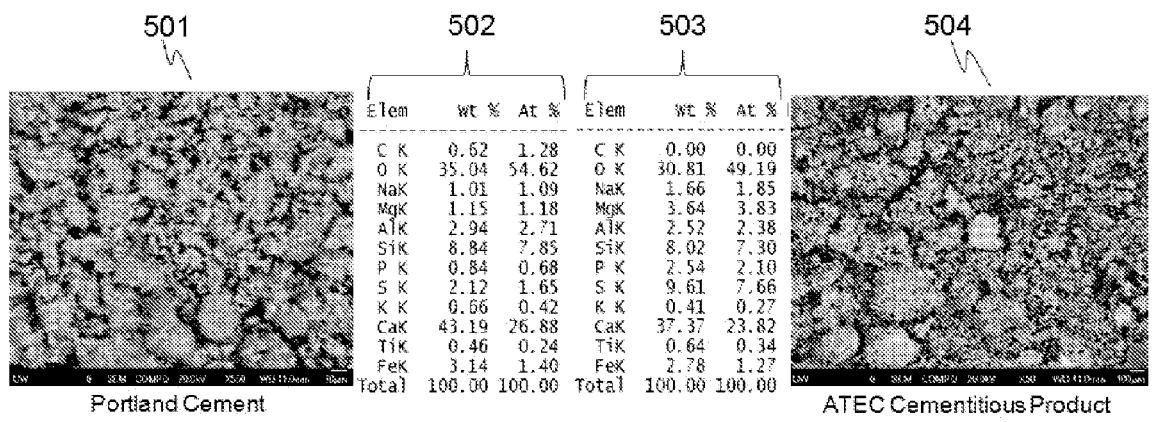
FIG. 5 illustrates an electron micrograph image and elemental composition table for Portland cement and reprocessed high carbon ash according to one embodiment of the present invention.

Each type of fly ash may result in specific formulations and reprocessing methods based on an initial Class C or Class F classification and fly ash content, among other factors. Fly ash tal composition of the processed material in FIG. 5 show that the carbon and the cenosphere structure are both absent in the reprocessed material. The re-processed product material of the present invention has an appearance and overall elemental composition that is very close to that of hydraulic (portland) cement illustrated in FIG. 5.

FIG. 5 illustrates an SEM image of Portland cement 501 and a measured average elemental composition 502 of Portland cement. FIG. 5 further illustrates an SEM image of the ATEC hydraulically active cementitious product 504 and an elemental composition listing 503 of the ATEC hydraulically active cementitious product made from high carbon CFA subjected to ATEC processing.

The ATEC hydraulically active cementitious product 504 exhibits hydraulic reactivity, as does the Portland cement. Elemental composition 503 of the ATEC hydraulically active cementitious product is similar to the elemental composition 502 of Portland cement. The ATEC cementitious material product may be cast to mortar samples without the addition of Portland cement. Furthermore, comparing the fly ash image shown in FIG. 4 to that of the ATEC product 504 shown in FIG. 5, shows that the structure of the fly ash has been substantially changed by ATEC re-processing according to the present invention. For example, the cenospheres illustrated in FIG. 4 are broken down and the carbon bodies shown in FIG. 4 are absent in the SEM image of the ATEC hydraulically active cementitious product 504. According to one embodiment, the ATEC cementitious product may provide a 50% substitute for Portland cement in a standard ASTM mix that generally includes 2.75 parts sand to 1 part Portland cement, with 0.4 parts of water by weight. This formulation yields highly workable and readily finished cement.

FIG. 6 is a table that compares the compressive strength data of concrete having a mixture of the reprocessed fly ash compared to a sample of 100% Portland cement at 7 days and at 35 days after casting. The reprocessed fly ash (ATEC cementitious product) sample includes 20% fly ash replacement for the Portland cement that is normally used in an ASTM mixture as described above. The high relative strength of the fly ash mixture after both 7 and 35 days shows the hydraulic activity of the coal fly ash as re-processed by the present invention. The compression testing was performed in accordance with ASTM standard 109C.

As shown in FIG. 6, these tests demonstrated that, rather than reducing the 7 day compressive strength of the concrete as would be expected in the case of fly ash substitution, the samples with the ATEC material have compressive strength of up to 6% greater than that of the 100% Portland cement mix. As can be seen, this increase in compressive strength compared to the 100% Portland cement mix was still observed at 35 days after casting.

The compressive strengths for the control samples show that the capability to enhance the strength of concrete mix was a result of the ATEC re-processing. Controls include a high carbon Class C CFA as received and a high carbon Class C CFA with the carbon removed by heating at 1000 degrees C. Note that the highest compressive strength of any material tested, including 100% Portland cement was achieved by the ATEC samples at both 7 and 35 days of curing.

One of ordinary skill in the art will readily appreciate that the early (7 day) compressive strength of the cement with the SCM substituted for 20% of the portland cement is remarkably high, both in relative and absolute terms. At 7,338 psi, the resulting material qualifies as a high strength concrete. Generally, the substitution of 20% of the portland cement in a mixture is expected to result in an approximate 10%-20% deficit in compressive strength at 7 days as compared to concrete made with 100% Portland cement. However, the addition of the ATEC cementitious product of the present invention resulted in a 6% increase in compressive strength.

Application Example of the Present Invention

As an example of a preferred embodiment, the invention may be used to reprocess high carbon Class C coal fly ash having a carbon content in excess of 30%, as determined by loss on ignition ("LOI") and an average calorific value of approximately 5,000 BTU/lb, to produce a hydraulically reactive cementitious material that imparts high strength characteristics to the concrete from mixes in which it is used. FIG. 4 is an electron micrograph image of Class C high carbon fly ash as received from a coal fired power plant.

The Class C high carbon fly ash includes hollow glassy cenospheres of varying sizes was well as carbon particles. A relatively large dark amorphous carbon particle is apparent in the center of the viewing field of in FIG. 4. In an unprocessed state, the carbon renders the fly ash unusable as a supplementary cementitious material.

Referring now to FIG. 2 and FIG. 3, prior to thermal treatment in the thermal reactor 204, the fresh or dry-stored Class C high carbon fly ash material 201 is mixed in the feed stock blender 232 with desired bed materials 203. An amount of pulverized coal or ancillary fuel 202 needed to bring the total average calorific value of the feedstock to greater than approximately 9,200 BTU/lb is charged into the thermal reactor/gasifier 204 from ancillary feed sources 202 and storage hopper 233. A combination of water and pulverized coal or other hydrocarbon oil is used to maintain synthesis gas or syngas quality and adequate fuel calorific value.

To produce a hydraulically reactive cementitious material, a mixture of the high carbon Class C coal fly ash and crushed limestone and pulverized coal is transferred from the feed stock blender 232 into the thermal reactor 204, which is operated in the reducing mode as a gasifier in this example. The weight proportion of the Class C coal fly ash to crushed limestone in this example was 2:1. This proportion may vary depending on the amount of calcium oxides needed to reach the desired Ca:Si elemental composition ratio in the overall material. Normally this elemental composition ratio (in terms of Atomic %) will be slightly in excess of 3:1, as shown in the elemental composition table 503 for the ATEC process cementitious material product 504 in FIG. 5.

The residual inorganic oxides left behind after the removal of carbon, water and other volatiles during the gasification process at temperatures of up to approximately 1,000 to 1,300 degrees C. are then introduced into the rotary kiln unit 209. At sufficiently high temperatures of approximately 1,300 degrees C. or higher, and with proper rotary mixing, the calcium, silicon, iron and aluminum oxides residues from the coal, CFA, limestone and sand begin to form calcium and aluminum silicates and ferrites.

Within the rotating kiln 209, the temperature of the residual oxides is increased to approximately 1,450 degrees C. for a period of time needed to complete the formation of hydraulically reactive dicalcium and tricalcium silicates. Adequate mixing of the various components within the rotating kiln 209 is important to the production of suitable reactive cementitious materials.

The optimal temperature profile to be achieved and maintained in the kiln 209 will vary depending on the state and composition of the inorganic feed 210 entering the kiln 209.Thus, the temperature values provided herein are only approximate. The proper temperatures to be used are those that result in a partially fused clinker or nodule materials which, when properly quenched and ground, yield a hydraulically active cementitious material. The hot clinker or nodules 212 and associated particles leave the kiln 209 via the locking mechanism 310 and enter the quench chamber 313, where they are cooled, and thereafter are stored and further cooled in a grated hopper 314.

The clinker or nodules 212 and associated particulate matter may be mixed with other active ingredients or chemical admixtures to produce other types of cement, including ground granulated blast furnace slag cement, pozzolana cement, hydraulic cement, among other cement. The grinder 214 includes a grinding mechanism that mixes the clinker, nodules, particulate matter and any desired additives. The resulting ground cementitious mixture may be stored as product 216.

One of ordinary skill in the art will readily appreciate that custom additive formulations, custom process conditions, custom equipment and custom gasifier conditions will be determined based on a type of CFA initially provided and the properties and types of cementitious material.

The hydraulically active ATEC cementitious material produced by the invention, as described in the above example, can be used to impart enhanced compressive strength to concretes and mortars when used to replace between 20% to 50%, or more, of the Portland cement ordinarily used in the mixes for these materials. This characteristic of the present invention is of value in that it allows the production of high strength concretes using material that would otherwise be solid waste.

The invention offers several advantages over existing systems for the remediation of high carbon coal fly ash. The ATEC system of the present invention performs low-cost or no cost re-processing and recycling of fresh coal fly ash that would otherwise be deposited in landfills. The invention also reduces an amount of limestone and clay needed to make cement, with consequent reductions in energy costs and carbon dioxide emissions. Furthermore, the invention generates synthesis gas that may be used to generate electricity by a steam turbine or other energy-producing device. In other words, the system produces more energy than an amount needed to operate the reprocessing plant, which can be sold at a profit.

Additionally, the invention can provides carbon credits by the permanent disposal or recycling of high carbon fly ash that may be used in emerging cap and trade markets in the United States and/or elsewhere. These outcomes that result from the development and deployment of the present invention will have substantial positive impact on the economy and the environment.

The present invention provides a system that uses an ash-producing gasification process to yield both electrical energy and a carbon-free fly ash material that may be formulated into reactive SCM. The carbon-free fly ash material includes fine grained crystalline ash material. By reprocessing the CFA in a reducing atmosphere, the invention forms reactive cementitious materials, such as the various calcium silicates and other reactive species.

Another advantage of the present invention is that the carbon in the high carbon CFA is converted to synthesis gas, which provides a source of the heat energy needed to drive the cement forming reactions. Otherwise, prior to this invention, the carbon in the high carbon CFA rendered the CFA unusable as an SCM for cement. The invention further provides post consumer additives that may be used in paints, coatings, plastics and other products. As described above, the invention provides a system that performs environmentally friendly conversion of waste to energy for remediating hazardous CFA impoundments.

The present invention also provides for the permanent and safe sequestration, in concrete, of toxic metals such as mercury, lead, arsenic and others toxic elements found in coal fly ash. Concrete is well recognized as an effective material to sequester and immobilize the metals found in CFA. These elements become chemically bound to the concrete matrix, and for all intents and purposes, do not migrate out of the matrix.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

We claim:

1. A method of reprocessing high carbon coal fly ash to produce a cementitious material and a synthesis gas, the method comprising:
   depositing the high carbon coal fly ash, a bed material, and an ancillary carbonaceous fuel in a thermal reactor;
   gasifying the high carbon coal fly ash, the bed material, and the ancillary carbonaceous fuel in the thermal reactor to convert the high carbon coal fly ash, the bed material, and the ancillary carbonaceous fuel to a bottom ash and the synthesis gas;
   transferring the bottom ash to a kiln; and
   heating the bottom ash in the kiln to a temperature that produces cementitious clinker nodules.

2. The method according to claim 1, wherein heating the bottom ash includes mixing the bottom ash.

3. The method according to claim 2, further comprising grinding the cementitious clinker nodules to produce at least one of pozzolanic cement or hydraulic cement.

4. The method according to claim 1, further comprising adding at least one oxide to the high carbon coal fly ash to form the cementitious material having characteristics corresponding to the at least one oxide.

5. The method according to claim 1, further comprising providing a bed material into the thermal reactor and fluidizing the bed material in the thermal reactor.

6. The method according to claim 5, wherein providing the bed material includes providing at least one of limestone, coal bottom ash, sand and recycled concrete.

7. The method according to claim 1, further comprising metering air into the thermal reactor to perform gasification.

8. The method according to claim 1, further comprising extracting the synthesis gas from the thermal reactor and providing the synthesis gas to a combustor.

9. A method of reprocessing high carbon coal fly ash to produce a cementitious material and a synthesis gas, the method comprising:
   depositing the high carbon coal fly ash and an ancillary carbonaceous fuel in a thermal reactor;
   adding at least one oxide to the high carbon coal fly ash to form the cementitious material having characteristics corresponding to the at least one oxide;
   gasifying the high carbon coal fly ash and the ancillary carbonaceous fuel in the thermal reactor to convert the high carbon coal fly ash and the ancillary carbonaceous fuel to an ash and the synthesis gas;
   transferring the ash to a kiln; and
   heating the ash in the kiln to a temperature to produce cementitious clinker nodules.

10. The method according to claim 9, wherein heating the ash includes mixing the ash.

11. The method according to claim 10, further comprising grinding the cementitious clinker nodules to produce at least one of pozzolanic cement or hydraulic cement.

12. The method according to claim 9, wherein heating the ash to the temperature includes firing the kiln with at least one of pulverized coal, synthesis gas, shredded tires and waste oil.

13. The method according to claim 9, further comprising providing a bed material into the thermal reactor and fluidizing the bed material in the thermal reactor.

14. The method according to claim 13, wherein providing the bed material includes providing at least one of limestone, coal bottom ash, sand and recycled concrete.

15. The method according to claim 9, further comprising metering air into the thermal reactor to perform gasification.

16. The method according to claim 9, further comprising extracting the synthesis gas from the thermal reactor and providing the synthesis gas to a combustor.

\* \* \* \* \*